US010260586B2

(12) United States Patent
Churchill et al.

(10) Patent No.: US 10,260,586 B2
(45) Date of Patent: Apr. 16, 2019

(54) ADJUSTABLE NEGATIVE STIFFNESS SYSTEMS

(71) Applicant: HRL LABORATORIES, LLC, Malibu, CA (US)

(72) Inventors: Christopher B. Churchill, Ventura, CA (US); Geoffrey P. McKnight, Los Angeles, CA (US); Christopher P. Henry, Thousand Oaks, CA (US); David W. Shahan, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 93 days.

(21) Appl. No.: 15/405,014

(22) Filed: Jan. 12, 2017

(65) Prior Publication Data

US 2018/0195570 A1 Jul. 12, 2018

(51) Int. Cl.
*F16F 1/18* (2006.01)
*F16F 1/22* (2006.01)

(52) U.S. Cl.
CPC ............... *F16F 1/22* (2013.01); *F16F 1/185* (2013.01); *F16F 2228/063* (2013.01); *F16F 2228/066* (2013.01); *F16F 2230/183* (2013.01); *F16F 2236/04* (2013.01)

(58) Field of Classification Search
CPC .... F16F 1/22; F16F 3/02; F16F 15/073; F16F 2228/063
USPC .................................. 247/140.2, 47; 188/378
See application file for complete search history.

(56) References Cited

U.S. PATENT DOCUMENTS

| | | | | |
|---|---|---|---|---|
| 1,047,741 A | * | 12/1912 | Brown | B60B 9/04 152/71 |
| 3,644,688 A | * | 2/1972 | Tustin | B60M 1/20 191/40 |
| 4,710,656 A | * | 12/1987 | Studer | F16F 15/03 188/267 |
| 4,987,507 A | * | 1/1991 | Steltzer | F16F 1/18 360/261.1 |

(Continued)

FOREIGN PATENT DOCUMENTS

| | | | | |
|---|---|---|---|---|
| DE | | 506031 C | * 8/1930 | ................ F16F 1/26 |
| DE | 102010027954 A1 | * 10/2011 | .......... F16C 32/0434 |

(Continued)

OTHER PUBLICATIONS

U.S. Appl. No. 15/405,030 entitled: Adjustable Negative Stiffness Mechanisms, filed Jan. 12, 2017, 49 pages.

(Continued)

*Primary Examiner* — Robert A. Siconolfi
*Assistant Examiner* — Sam M Aung
(74) *Attorney, Agent, or Firm* — Lewis Roca Rothgerber Christie LLP

(57) ABSTRACT

A variable stiffness structure includes a first negative stiffness element configured to buckle in a first direction, a second negative stiffness element configured to buckle in a second direction opposite to the first direction, and an actuator operatively coupled to ends of the first and second negative stiffness elements to control a stiffness of the variable stiffness structure. The first negative stiffness element and the second negative stiffness element are mode-3 buckling beams.

18 Claims, 7 Drawing Sheets

(56) References Cited

U.S. PATENT DOCUMENTS

| | | | | |
|---|---|---|---|---|
| 5,947,453 A * | 9/1999 | Eastman | ................ | F16F 1/185 244/17.11 |
| 7,550,880 B1 * | 6/2009 | Pusl | ...................... | F16F 1/185 310/15 |
| 9,394,950 B1 * | 7/2016 | Henry | ..................... | F16F 1/324 |
| 2004/0159504 A1 * | 8/2004 | Beck | ....................... | B60T 1/062 188/74 |
| 2006/0061021 A1 * | 3/2006 | Dittmar | .................... | F16F 1/26 267/47 |
| 2006/0263082 A1 * | 11/2006 | Brown | ..................... | F16F 1/12 396/421 |
| 2011/0187036 A1 * | 8/2011 | Duval | ................. | B25J 19/0016 267/177 |
| 2013/0079159 A1 * | 3/2013 | Brosowske | ............ | F16D 31/06 464/27 |
| 2014/0190677 A1 * | 7/2014 | Platus | ...................... | F28F 9/26 165/185 |
| 2015/0123417 A1 * | 5/2015 | Patoglu | ............... | B25J 19/0091 294/213 |
| 2016/0348752 A1 * | 12/2016 | Churchill | ............. | F16F 15/073 |

FOREIGN PATENT DOCUMENTS

| | | |
|---|---|---|
| WO | WO 2015/130367 A2 | 9/2015 |
| WO | WO 2016/093810 A1 | 6/2016 |

OTHER PUBLICATIONS

International Search Report and Written Opinion dated Sep. 28, 2017 for corresponding PCT Application No. PCT/US2017/013225 (18 pages).

* cited by examiner

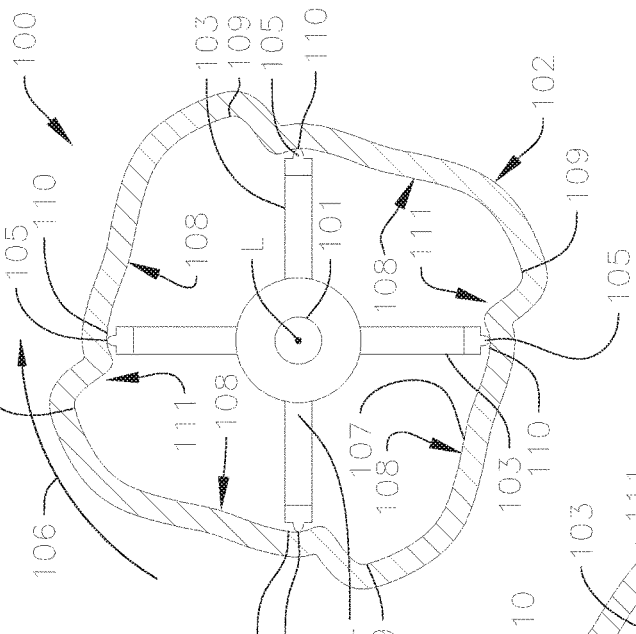
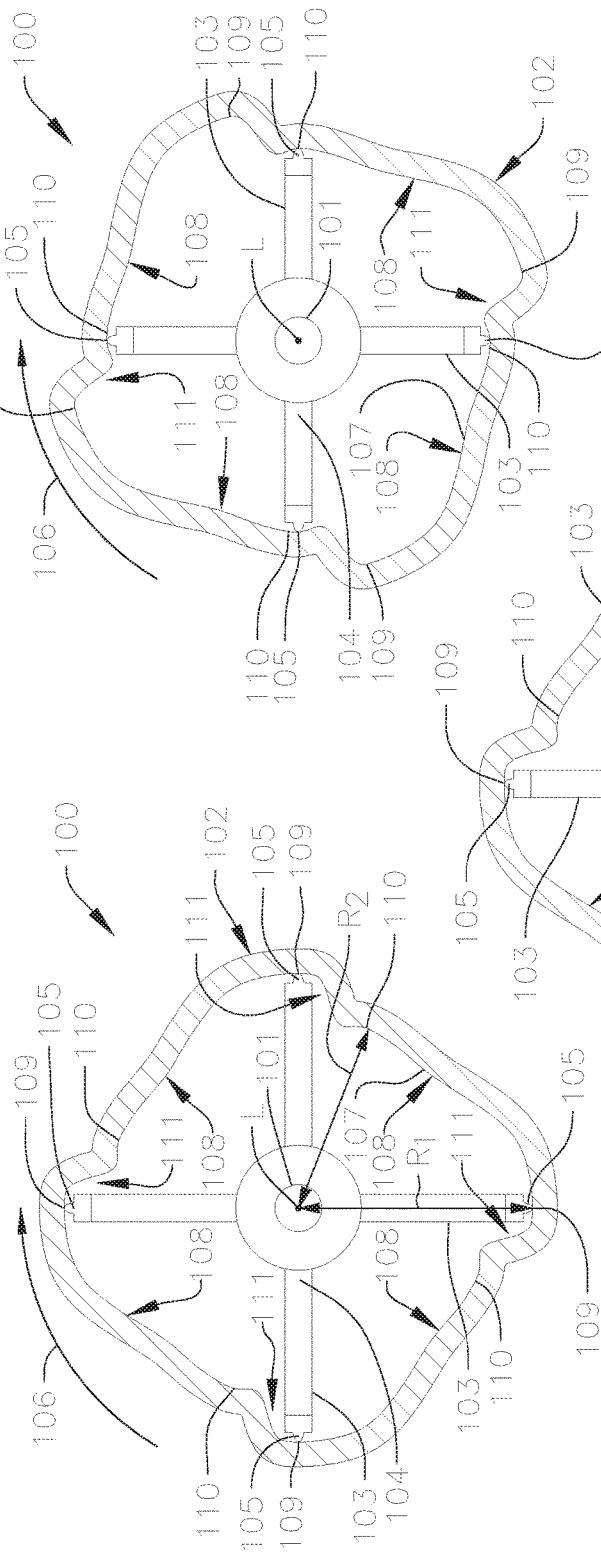
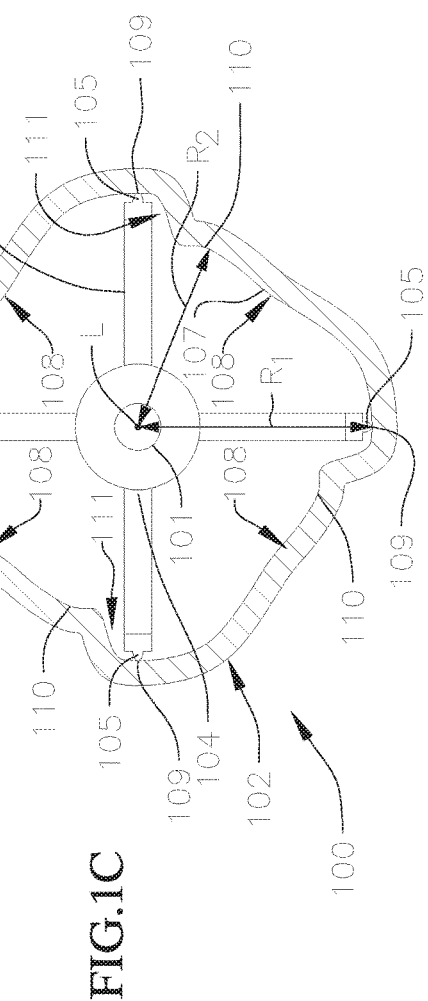

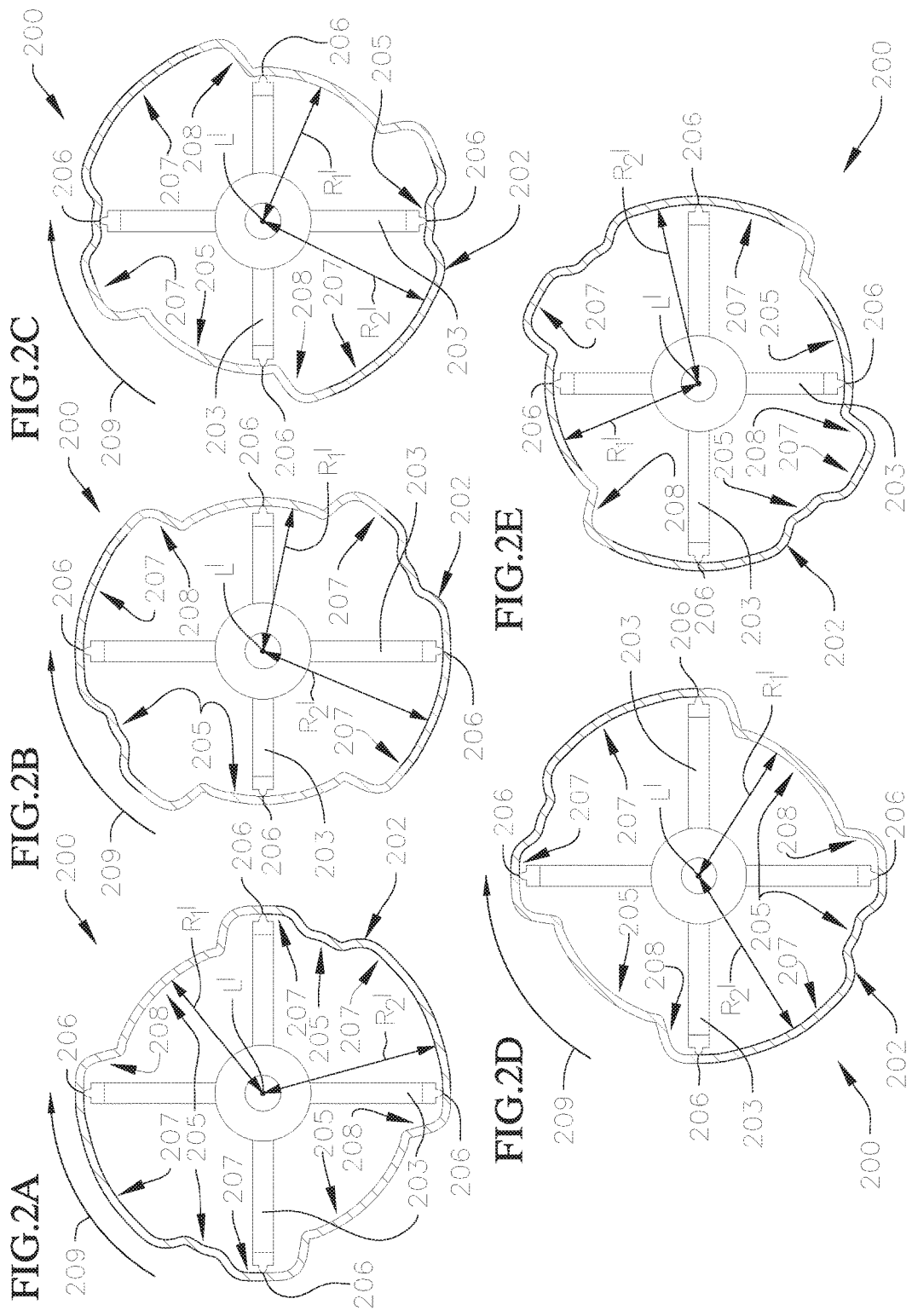

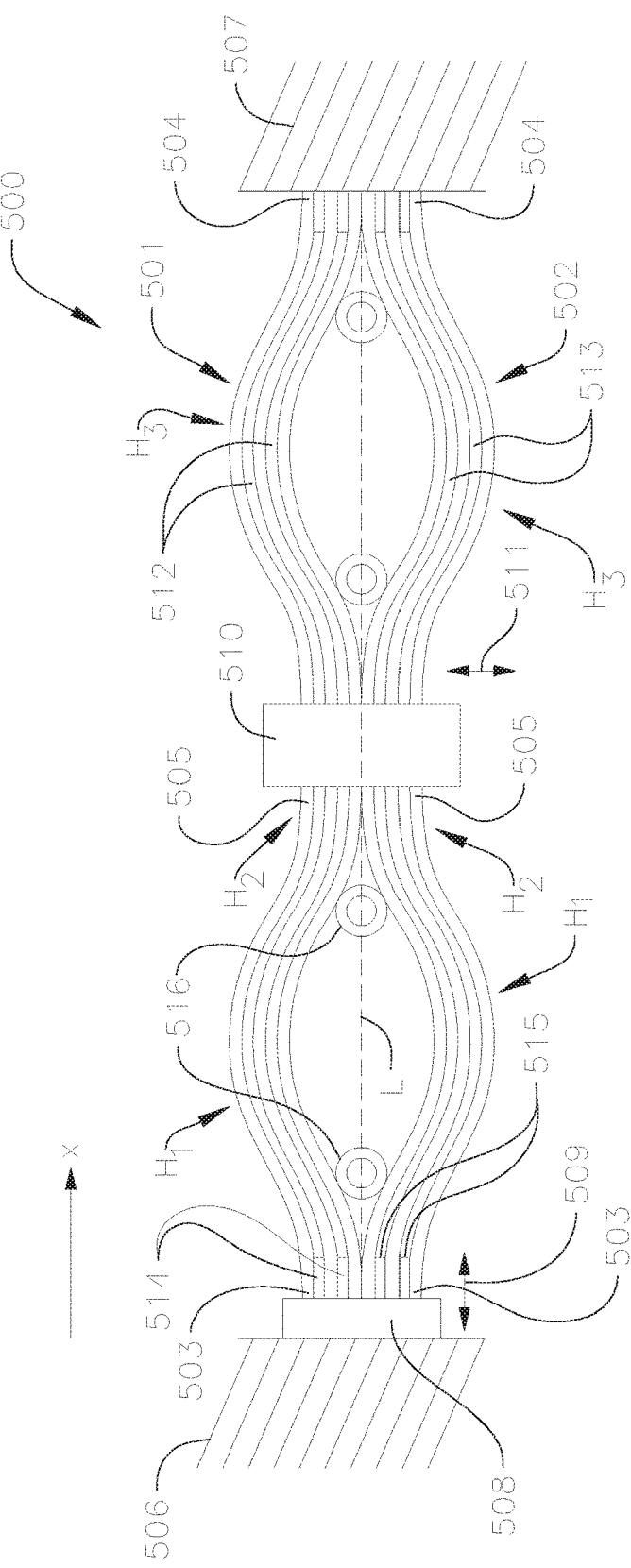

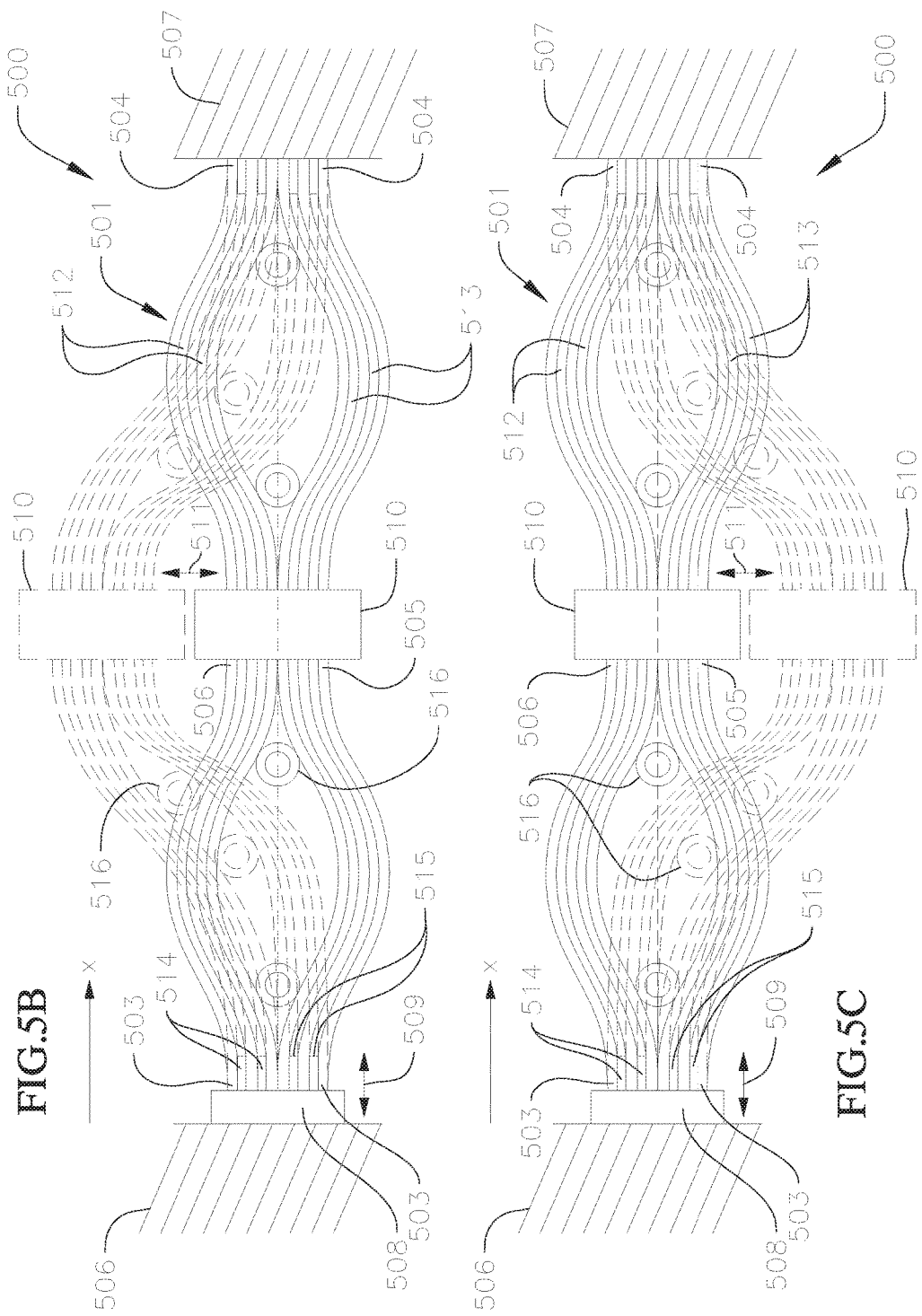

ADJUSTABLE NEGATIVE STIFFNESS SYSTEMS

FIELD

The present disclosure relates generally to negative stiffness mechanisms and, more particularly, to adjustable negative stiffness mechanisms.

BACKGROUND

A variety of non-linear structures exhibit negative mechanical stiffness, such as snap-through beams and buckling beams. Negative stiffness may also be exhibited by various combinations and arrangements of springs and/or beams with pinned or clamped boundaries. For instance, negative stiffness may be exhibited due to over-rotation of one of the components, or rolling or sliding contact between components. Negative stiffness mechanisms are useful in a variety of applications, including vibration isolation, shock mitigation, and signal processing.

Additionally, many related art negative stiffness mechanisms achieve high isolation travel and nearly linear negative stiffness by using a higher-order mode buckled beam. However, the use of a higher-order mode buckled beam limits the ability to change the negative stiffness (which is possible with first-order beam bending) and limits the ability to create a widely adjustable positive spring component. For instance, when beams are buckled they exhibit high negative stiffness, and when beams are unbuckled they exhibit positive stiffness. Due to the nature of higher-mode buckling, however, the negative stiffness is generally independent of the amount of beam compression, and therefore conventional negative stiffness mechanisms are limited to at most two states (i.e., many related art negative stiffness mechanisms are switchable between only two negative stiffness states, on and off). To put it another way, many related art negative stiffness mechanisms are not configured to switch or change between multiple negative stiffness states. In contrast, a device incorporating beams configured to switch between multiple states would allow the device to exhibit multiple values of negative stiffness because the full device stiffness is the sum of all beams.

SUMMARY

The present disclosure is directed to various embodiments of a variable stiffness structure. In one embodiment, the variable stiffness structure includes a first negative stiffness element configured to buckle in a first direction, a second negative stiffness element configured to buckle in a second direction opposite to the first direction, and an actuator operatively coupled to ends of the first and second negative stiffness elements to control a stiffness of the variable stiffness structure. The first negative stiffness element and the second negative stiffness element are mode-3 buckling beams. The first negative stiffness element may include a first stack of at least two negative stiffness bucking beams, and the second negative stiffness element may include a second stack of at least two negative stiffness buckling beams. The variable stiffness structure may also include at least one first spacer between adjacent negative stiffness buckling beams of the first stack and at least one second spacer between adjacent negative stiffness buckling beams of the second stack. The variable stiffness structure may also include at least one resilient element between an innermost one of the negative stiffness buckling beams of the first stack and an innermost one of the negative stiffness buckling beams of the second stack.

The present disclosure is also directed to various embodiments of an adjustable negative stiffness system. In one embodiment, the adjustable negative stiffness system includes a central shaft, a series of negative stiffness members radially arranged around the central shaft, and an actuator. Each negative stiffness member is configured to move between an unbuckled state and a buckled state. The actuator is configured to engage outer ends of the negative stiffness members to selectively move opposing pairs of the negative stiffness members between the unbuckled and buckled states. The actuator may include a cam having an inwardly-facing cam surface rotatable about the central shaft and surrounding the outer ends of the series of negative stiffness members. Rotation of the cam is configured to sequentially move the opposing pairs of the negative stiffness members between the unbuckled and buckled states. The inwardly-facing cam surface of the cam may have a non-sinusoidal shape or an irregular shape in a circumferential direction.

The inwardly-facing cam surface may include a series of compression segments configured to buckle the negative stiffness members and a series of relaxation segments configured to unbuckle the negative stiffness members. Each compression segment of the series of compression segments may transition non-linearly between a first end spaced apart from a longitudinal axis of the central shaft by a first radial distance and a second end spaced apart from the longitudinal axis by a second radial distance less than the first radial distance. Each compression segment of the series of compression segments may be spaced apart from a longitudinal axis of the central shaft by a substantially constant first radial distance and each relaxation segment of the series of relaxation segment may be spaced apart from the longitudinal axis of the central shaft by a substantially constant second radial distance greater than the first radial distance. The inwardly-facing cam surface of the cam may be configured such that rotation of the cam about the central shaft by an angle from approximately (about) 15 degrees to approximately (about) 45 degrees moves (changes) at least one pair of opposing negative stiffness members between the unbuckled and buckled states.

A first pair of opposing negative stiffness members may have a different configuration than a second pair of opposing negative stiffness members. The actuator may include a series of cams and each cam of the series of cams may be engageable with the outer end of one of the series of negative stiffness members. The actuator may include a first pair of actuators coupled to a first pair of opposing negative stiffness members, a second pair of actuators coupled to a second pair of opposing negative stiffness members, a first valve coupled to the first pair of actuators, and a second valve coupled to the second pair of actuators. The first and second valves are each configured to move between an open position and a closed position. When the first valve is in the open position, the first pair of actuators moves the first pair of opposing negative stiffness members into the buckled position. When the second valve is in the open position, the second pair of actuators moves the second pair of opposing negative stiffness members into the buckled position. The first and second pairs of actuators may be any suitable type or types of actuators, such as hydraulic actuators, pneumatic actuators, electromagnetic actuators, thermal actuators, piezoelectric actuators, and/or mechanical actuators. The adjustable negative stiffness system may also include a power source coupled to the first and second pairs of actuators.

An adjustable negative stiffness system according to another embodiment of the present disclosure includes a base, a series of negative stiffness members coupled to the base and arranged along a direction, and a rotatable cam having a series of regions. Each negative stiffness member of the series of negative stiffness members is configured to move between an unbuckled state and a buckled state. Each region has a cam surface configured to engage an end of one of the negative stiffness members opposite the base to move the negative stiffness members between the unbuckled and buckled states. The adjustable negative stiffness system may include a crank configured to facilitate manual rotation of the rotatable cam and/or a motor configured to rotate the rotatable cam. A first cam surface of a first region of the cam may be the same or different than a second cam surface of a second region of the cam. The adjustable negative stiffness system may include a series of tensile members coupled to the series of negative stiffness members.

This summary is provided to introduce a selection of concepts that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale FIGS. 1A-1C are top views of an adjustable negative stiffness system according to one embodiment of the present disclosure in a first state, a second state, and a third state, respectively;

FIGS. 2A-2E are top views of an adjustable negative stiffness system according to another embodiment of the present disclosure in a first state, a second state, a third state, a fourth state, and a fifth state, respectively;

FIG. 5A is a schematic view of a snap-through buckling beam type variable stiffness structure according to one embodiment of the present disclosure.

FIG. 5B is a schematic view illustrating the embodiment of the snap-through buckling beam type variable stiffness structure of FIG. 5A in a neutral position and a first deflected position; and FIG. 5C is a schematic view illustrating the embodiment of the snap-through buckling beam type variable stiffness structure of FIG. 5A in a neutral position and a second deflected position.

DETAILED DESCRIPTION

Figure 3A:
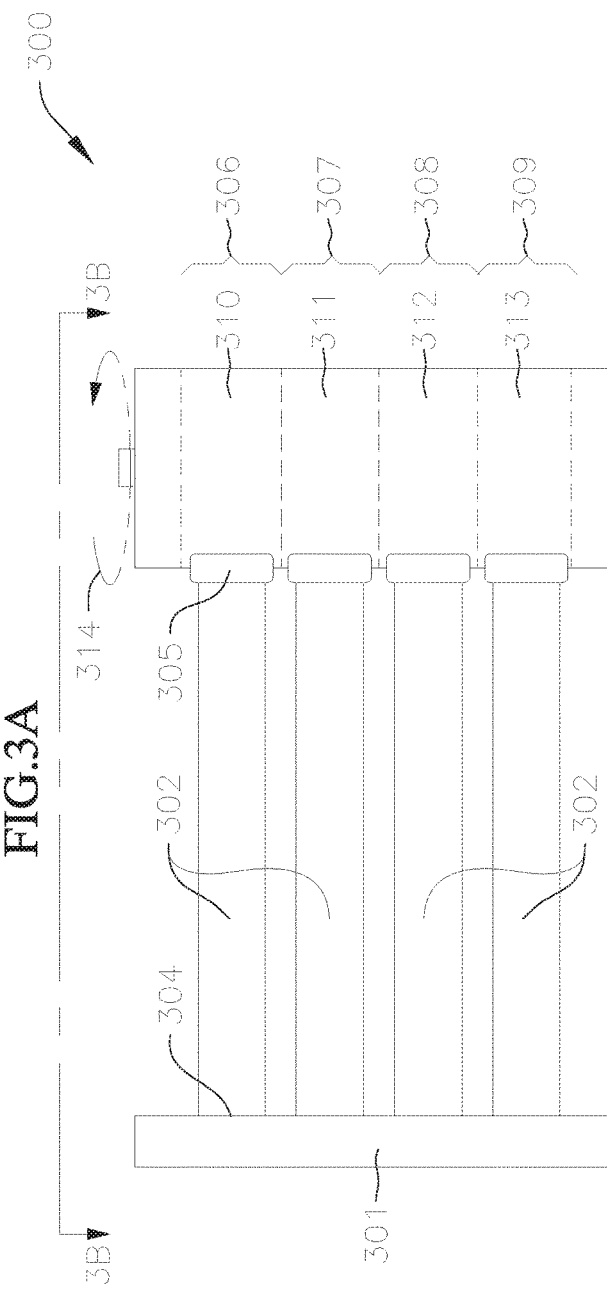
FIGS. 3A-3B are a top view and a side view, respectively, of an adjustable negative stiffness system according to one embodiment of the present disclosure.

The present disclosure is directed to various embodiments of an adjustable negative stiffness system. The negative stiffness systems of the present disclosure may be incorporated into any desired structure or device depending on the intended purpose or function of the negative stiffness system, such as, for instance, as a tuned-mass damper or as a mechanism for vibration isolation, shock mitigation, or signal processing. For instance, the adjustable negative stiffness systems of the present disclosure may be incorporated into a structure as a payload mount (e.g., a mount for sensitive electronics on a helicopter that is configured to isolate the electronics from multiple rotor frequencies, position and navigation sensors, radar, cameras, or antennas) or as a component of a vehicle (e.g., as a motor mount for an automobile configured to isolate vibration between the engine and the chassis). The adjustable negative stiffness systems of the present disclosure may be incorporated as vibration and shock isolation systems for transportation applications (e.g., payload mounts, combustion engine mounts, vehicle suspensions, or in a landing gear). The negative stiffness response of the adjustable negative stiffness systems of the present disclosure may be adjusted depending, for instance, on the required travel speed of the vehicle and/or the anticipated surface conditions and/or obstacles the vehicle is expected to incur (e.g., obstacles incurred during off-road or all-terrain use of the vehicle into which the adjustable negative stiffness system is incorporated). Additionally, the adjustable negative stiffness systems of the present disclosure may be configured to exhibit discrete negative stiffness response changes at infrequent intervals, which are configured to reduce the power and energy requirements of the present adjustable negative stiffness systems compared to fully active systems.

With reference now to FIGS. 1A-1C, an adjustable negative stiffness system 100 according to one embodiment of the present disclosure includes a central shaft 101 defining a longitudinal axis L, a cam 102 extending around the central shaft 101, and a plurality of negative stiffness members 103 extending radially outward between the central shaft 101 and the cam 102. In the illustrated embodiment, each of the plurality of negative stiffness members 103 includes an inner end 104 fixedly coupled to the central shaft 101 and an outer end 105 slidable along the cam 102 (i.e., the cam 102 is configured to engage the outer ends 105 of the negative stiffness members 103). In the illustrated embodiment, the cam 102 extends around the outer ends 105 of each of the negative stiffness members 103. Although in the illustrated embodiment, the negative stiffness system 100 includes four negative stiffness members 103 circumferentially and equidistantly spaced around the central shaft 101 (e.g., two pairs of opposing negative stiffness members 103), in one or more embodiments, the negative stiffness system 100 may include any other suitable number of negative stiffness members 103, such as, for instance, from two to ten negative stiffness members 103, and the negative stiffness members 103 may be arranged in any other suitable manner.

In the illustrated embodiment, each of the negative stiffness members 103 includes one or more snap-through beams. Accordingly, each of the negative stiffness members 103 is configured to "snap" between a first stable position and a second stable position. Within an envelope defined or bounded by these two stable positions, the adjustable negative stiffness system 100 exhibits negative stiffness (i.e., negative stiffness is generated during snap through between the two stable positions). Outside of this envelope bounded by the two stable positions of the negative stiffness members 103, the adjustable negative stiffness system 100 exhibits positive stiffness. Accordingly, the adjustable negative stiffness system 100 exhibits non-linear stiffness (i.e., the adjustable negative stiffness system 100 exhibits both positive and negative stiffness). For instance, when an upward force is applied to the cam 102, the adjustable negative stiffness system 100 is configured to initially exhibit a positive stiffness resisting the upward deflection. However, as the force and the magnitude of the upward deflection increase, the adjustable negative stiffness system 100 will reach a snap-through point at which the negative stiffness members 103 of the adjustable negative stiffness system 100 will "snap-through" to a stable higher position. During snap through, the adjustable negative stiffness system 100 exhibits negative stiffness (i.e., the adjustable negative stiffness system 100 exhibits an upward force in the direction in which the load was applied to the cam 102). Similarly, when a downward force is applied to the cam 102, the adjustable negative stiffness system 100 is initially configured to exhibit a positive stiffness resisting the downward deflection. However, as the force and the magnitude of the downward deflection increase, the adjustable negative stiffness system 100 will reach a snap-through point at which the negative stiffness members 103 of the adjustable negative stiffness system 100 will snap-through to a stable lower position. During snap through, the adjustable negative stiffness system 100 exhibits negative stiffness (i.e., the adjustable negative stiffness system 100 exhibits a downward force in the direction in which the load was applied to the cam 102). In this manner, the negative stiffness members 103 are configured to mechanically isolate the central shaft 101 from vibrations in the cam 102 and/or to mechanically isolate the cam 102 from vibrations in the central shaft 101. In one or more embodiments, each of the negative stiffness members 103 includes a pair of compressive snap-through beams. In one or more embodiments, the negative stiffness members 103 may include any other suitable number of snap-through beams (e.g., a single snap-through beams or a stack of three or more snap-through beams) and negative stiffness members 103 may be any other suitable type or kind of mechanism exhibiting a negative stiffness mechanical response.

The cam 102 is configured to rotate (arrow 106) relative to the central shaft 101 and the negative stiffness members 103 to move the negative stiffness members 103 between an elongated or relaxed state (e.g., an unbuckled state) and a compressed state (e.g., a buckled state). In the illustrated embodiment, the cam 102 includes an inwardly facing cam surface 107 having a series of contoured compression segments 108 configured to engage the outer ends 105 of the negative stiffness members 103. The contoured compression segments 108 of the cam 102 are configured to compress (e.g., buckle) the negative stiffness members 103 when the cam 102 rotates (arrow 106) into certain angular positions. In the illustrated embodiment, the cam 102 includes four contoured compression segments 108. In one or more embodiments, the cam 102 may include any other suitable number of contoured segments 108, depending, for instance, on the number of negative stiffness members 103 (e.g., the number of contoured compression segments 108 may correspond to the number of negative stiffness members 103). Additionally, in the illustrated embodiment, each contoured compression segment 108 includes a first end 109 spaced apart from the longitudinal axis L of the central shaft 101 by a first radial distance $R_1$ and a second end 110 spaced apart from the longitudinal axis L by a second radial distance $R_2$ less than the first radial distance R1. In the illustrated embodiment, each contoured compression segment 108 tapers or transitions non-linearly between the first and second ends 109, 110. In the illustrated embodiment, each contoured compression segment 108 spans approximately (about) 70 degrees around the central shaft 101. In one or more embodiments, each contoured compression segment 108 may extend or span any other suitable extent around the central shaft 101, such as, for instance, from approximately (about) 60 degrees to approximately (about) 80 degrees around the central shaft 101.

Additionally, in the illustrated embodiment, the inwardly-facing cam surface 107 of the cam 102 also includes a series of relaxation segments 111 configured to engage the outer ends 105 of the negative stiffness members 103. In the illustrated embodiment, the cam 102 includes four contoured relaxation segments 111. In one or more embodiments, the cam 102 may include any other suitable number of contoured relaxation segments 111, depending, for instance, on the number of negative stiffness members 103 (e.g., the number of contoured relaxation segments 111 may correspond to the number of negative stiffness members 103). The contoured relaxation segments 111 of the cam 102 are configured to relax (e.g., unbuckle) the negative stiffness members 103 when the cam 102 rotates (arrow 106) into certain angular positions. Additionally, in the illustrated embodiment, the relaxation segments 111 extend between (e.g., interconnect) the first end 109 of each compression segment 108 to the second end 110 of the adjacent compression segment 108. In the illustrated embodiment, each relaxation segment 111 spans approximately (about) 20 degrees around the central shaft 101. In one or more embodiments, each relaxation segment 111 may extend or span any other suitable extent around the central shaft 101, such as, for instance, from approximately (about) 10 degrees to approximately (about) 30 degrees around the central shaft 101. Additionally, in the illustrated embodiment which includes four equally spaced negative stiffness members 103, the compression and relaxation segments 108, 111 are complementary angles.

In the illustrated embodiment, the curvature of the inwardly-facing cam surface 107 is irregular. In one or more embodiments, the curvature of the inwardly-facing cam surface 107 may be non-sinusoidal.

In an initial position illustrated in FIG. 1A, the outer ends 105 of the negative stiffness members 103 are aligned with the first ends 109 of the contoured compression segments 108 of the inwardly-facing cam surface 107 and the negative stiffness members 103 are in the relaxed (e.g., uncompressed or unbuckled) state. In operation, when the cam 102 is rotated (arrow 106) approximately (about) 70 degrees from the initial position in FIG. 1A to a position illustrated in FIG. 1B, the outer ends 105 of the negative stiffness members 103 slide along the inwardly facing cam surface 107 from the first ends 109 of the contoured compression segments 108 to the second ends 110 of the contoured compression segments 108, which compresses (e.g., buckles out of the plane of the page of FIGS. 1A-1C) each of the negative stiffness members 103. As the cam 102 continues to rotate (arrow 106) from the position in FIG. 1B to the position in FIG. 1C, the outer ends 105 of the negative stiffness members 103 slide along the inwardly facing cam surface 107 from the second ends 110 of the contoured compression segments 108, along the relaxation segments 111, to the first ends 109 of the contoured compression segments 108, which relaxes (e.g., unbuckles) each of the negative stiffness members 103. In the illustrated embodiment, the negative stiffness members 103 are in the same state or condition (e.g., relaxed or unbuckled) in FIG. 1C as in FIG. 1A. In this manner, the negative stiffness response of the adjustable negative stiffness system 100 may be changed (e.g., switched) by rotating (arrow 106) the cam 102 relative to the central shaft 101 and the negative stiffness members 103 to compress (e.g., buckle) or elongate (e.g., unbuckle) the negative stiffness members 103. In the embodiment of the adjustable negative stiffness system 100 illustrated in FIGS. 1A-1C, all of the negative stiffness members 103 move in unison between the compressed (e.g., buckled) and the relaxed (e.g., unbuckled) states. That is, in the illustrated embodiment, all of the negative stiffness members 103 are either in the compressed (e.g., buckled) state or all of the negative stiffness members are in the relaxed (e.g., unbuckled) state. Accordingly, the embodiment of the adjustable negative stiffness system 100 illustrated in FIGS. 1A-1C may be switched or changed between two negative stiffness response states.

FIGS. 2A-2E illustrate an adjustable negative stiffness system 200 according to another embodiment of the present disclosure in which fewer than all of the negative stiffness members are configured to move or switch between compressed (e.g., buckled) and relaxed (e.g., unbuckled) states with each rotation of the cam. That is, the negative stiffness members of the adjustable negative stiffness system 200 may be selectively moved between the compressed (e.g., buckled) and the relaxed (e.g., unbuckled) states.

In the illustrated embodiment, the adjustable negative stiffness system 200 includes a central shaft 201 defining a longitudinal axis L', a cam 202 extending around the central shaft 201, and a plurality of negative stiffness members 203 extending radially outward between the central shaft 201 and the cam 202. The negative stiffness members 203 may have the same or similar configuration as the negative stiffness members 103 in the embodiment of the adjustable negative stiffness system 100 illustrated in FIGS. 1A-1C. Additionally, although in the illustrated embodiment, the negative stiffness system 200 includes four negative stiffness members 203 circumferentially and equidistantly spaced around the central shaft 201 (e.g., two pairs of opposing negative stiffness members 203), in one or more embodiments, the negative stiffness system 200 may include any other suitable number of negative stiffness members 203, such as, for instance, from two to ten negative stiffness members 203, and the negative stiffness members 203 may be arranged in any other suitable manner. Although the adjustable negative stiffness system 200 is described hereinafter as including a "vertically oriented" pair of negative stiffness members 203 and a "horizontally oriented" negative stiffness members 203, these terms are used for ease of reference only and do not limit the potential orientations of the negative stiffness members 203.

With continued reference to the embodiment illustrated in FIGS. 2A-2E, the cam 202 includes an inwardly facing cam surface 204 having a series of contoured compression segments 205 configured to engage outer ends 206 of the negative stiffness members 203 to compress (e.g., buckle) the negative stiffness members 203, and a series of relaxation segments 207 configured to engage the outer ends 206 of the negative stiffness members 203 to relax (e.g., unbuckle) the negative stiffness members 203. In the illustrated embodiment, the inwardly-facing cam surface 204 of the cam 202 also includes a series of transition segments 208 connecting the compression segments 205 to the relaxation segments 207. Additionally, in the illustrated embodiment, each of the compression segments 205 has a constant or substantially constant distance $R_{1'}$ (i.e., radius) from the longitudinal axis L' of the central shaft 201 and each of the relaxation segments 207 has a constant or substantially constant distance $R_{2'}$ (i.e., radius) from the longitudinal axis L' of the central shaft 201. Additionally, in the illustrated embodiment, the first distance $R_{1'}$ of the compression segments 205 is less than the second distance $R_{2'}$ of the relaxation segments 207.

In an initial position illustrated in FIG. 2A, the outer ends 206 of the negative stiffness members 203 are aligned with the relaxation segments 207 of the inwardly-facing cam surface 204 and the negative stiffness members 203 are in the relaxed (e.g., uncompressed or unbuckled) state. In operation, when the cam 202 is rotated (arrow 209) approximately (about) 30 degrees from the initial position in FIG. 2A to a position illustrated in FIG. 2B, the outer ends 206 the pair of negative stiffness members 203 oriented horizontally in FIGS. 2A-2E slide from the relaxation segments 207 along the transition segments 208 to the compression segments 205, which compresses (e.g., e.g., buckles out of the plane of the page of FIGS. 2A-2E) the horizontally oriented pair of negative stiffness members 203. Additionally, the vertically oriented pair of negative stiffness members 203 remain aligned with the relaxation segments 207 and therefore the vertically oriented negative stiffness members 203 remain in the relaxed (e.g., uncompressed or unbuckled) state when the adjustable negative stiffness system 200 is in the position illustrated in FIG. 2B.

When the cam 202 is rotated (arrow 209) approximately (about) 30 degrees from the position in FIG. 2B to the position in FIG. 2C, the outer ends 206 of the vertically oriented negative stiffness members 203 slide from the relaxation segments 207 along the transition segments 208 to the compression segments 205, which compresses (e.g., buckles out of the plane of the page) the vertically oriented pair of negative stiffness members 203. Additionally, the horizontally oriented pair of negative stiffness members 203 remain aligned with the compression segments 205 and therefore the horizontally oriented negative stiffness members 203 remain in the compressed (e.g., buckled) state when the negative stiffness system 200 is in the position illustrated in FIG. 2C. Accordingly, when the negative stiffness system 200 is in the position illustrated in FIG. 2C, both the vertically oriented pair of negative stiffness members 203 and the horizontally oriented pair of negative stiffness members 203 are in the compressed (e.g., buckled) state.

When the cam 202 is rotated (arrow 209) approximately (about) 30 degrees from the position in FIG. 2C to the position in FIG. 2D, the outer ends 206 of the vertically oriented negative stiffness members 203 and the horizontally oriented negative stiffness members 203 all slide from the compression segments 205 along the transition segments 208 to the relaxation segments 207, which relax (e.g., uncompress or unbuckle) the vertically and horizontally oriented pairs of negative stiffness members 203. Accordingly, when the negative stiffness system 200 is in the position illustrated in FIG. 2D, both the vertically oriented pair of negative stiffness members 203 and the horizontally oriented pair of negative stiffness members 203 are in the relaxed (e.g., uncompressed or unbuckled) state.

When the cam 202 is rotated (arrow 209) approximately (about) 30 degrees from the position in FIG. 2D to a position illustrated in FIG. 2E, the outer ends 206 the vertically oriented pair of negative stiffness members 203 slide from the relaxation segments 207 along the transition segments 208 to the compression segments 205, which compresses (e.g., buckles out of the plane of the page) the vertically oriented pair of negative stiffness members 203. Additionally, the horizontally oriented pair of negative stiffness members 203 remain aligned with the relaxation segments 207 and therefore the horizontally oriented negative stiffness members 203 remain in the relaxed (e.g., uncompressed or unbuckled) state when the negative stiffness system 200 is in the position illustrated in FIG. 2E.

Based on the foregoing description, it will be appreciated that the embodiment of the negative stiffness system 200 illustrated in FIGS. 2A-2E is configured to move selective pairs of the negative stiffness members 203 between the compressed (e.g., buckled) and the relaxed (e.g., unbuckled) states with each rotation (arrow 209) of the cam 202.

In one or more embodiments, negative stiffness system 200 may include negative stiffness members 203 with two or more different configurations. For instance, in one or more embodiments, the pair negative stiffness members 203 oriented vertically in FIGS. 2A-2E may have a different configuration (e.g., different thickness and/or different width) than the pair negative stiffness members 203 oriented horizontally in FIGS. 2A-2E such that the adjustable negative stiffness system 200 in the state illustrated in FIG. 2B exhibits a different stiffness behavior than the adjustable negative stiffness system 200 in the state illustrated in FIG. 2E.

Additionally, although in the illustrated embodiment the cam 202 is configured such that a 30 degree rotation (arrow 209) of the cam 202 moves one or more pairs of the negative stiffness members 203 between the compressed (e.g., buckled) and the relaxed (e.g., unbuckled) states, in one or more embodiments the cam 202 may be configured such that other suitable angular rotation (arrow 209) of the cam 202 is configured to move the negative stiffness members 203 between the compressed (e.g., buckled) and the relaxed (e.g., unbuckled) states, such as, for instance, from approximately 15 degrees to approximately (about) 45 degrees.

Figure 3B:
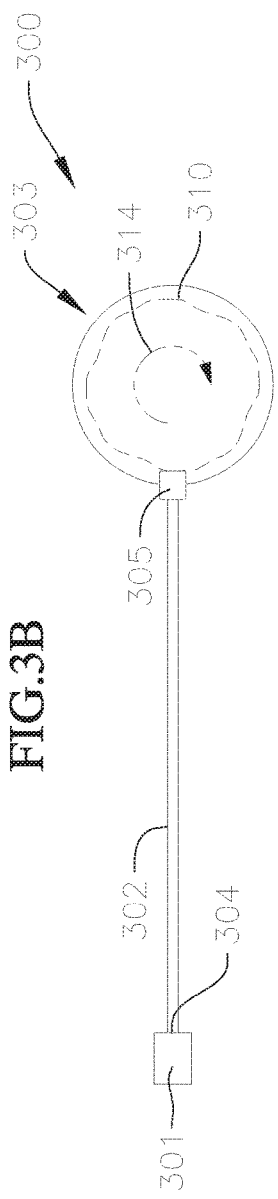

With reference now to FIGS. 3A-3B, a negative stiffness system 300 according to another embodiment of the present disclosure includes an output block 301, a series of negative stiffness members 302 arranged along a direction (e.g., a horizontal or vertical direction), and a cam 303. The negative stiffness members 302 extend between the output block 301 and the cam 303. Inner ends 304 of the negative stiffness members 302 are coupled to the output block 301 and the cam 303 is configured to engage outer ends 305 of the negative stiffness members 302 to move the negative stiffness members 302 between compressed (e.g., buckled) and relaxed (e.g., unbuckled) states. The negative stiffness members 302 may have the same or similar configuration as the negative stiffness members 103 in the embodiment of the adjustable negative stiffness system 100 illustrated in FIGS. 1A-1C (e.g., each negative stiffness member 302 may include one or more snap-through beams). Additionally, although in the illustrated embodiment, the negative stiffness system 300 includes four negative stiffness members 302, in one or more embodiments, the negative stiffness system 300 may include any other suitable number of negative stiffness members 302, such as, for instance, from two to ten negative stiffness members 302. Additionally, in one or more embodiments, the negative stiffness system 300 may include tensile members extending between the outer and inner ends of the negative stiffness members 302.

In the illustrated embodiment, the cam 303 includes a series of regions 306, 307, 308, 309 each having a cam surface profile 310, 311, 312, 313, respectively, configured to engage the outer end 305 of one of the negative stiffness members 302. In the illustrated embodiment, the cam 303 includes four regions 306, 307, 308, 309, with each region 306, 307, 308, 309 corresponding to one of the negative stiffness members 302. In one or more embodiments, the cam 303 may include any other suitable number of regions depending, for instance, on the number of negative stiffness members 302 (e.g., the number of cam surface profiles 310, 311, 312, 313 on the cam 303 may correspond to the number of negative stiffness members 302).

Figure 3C:
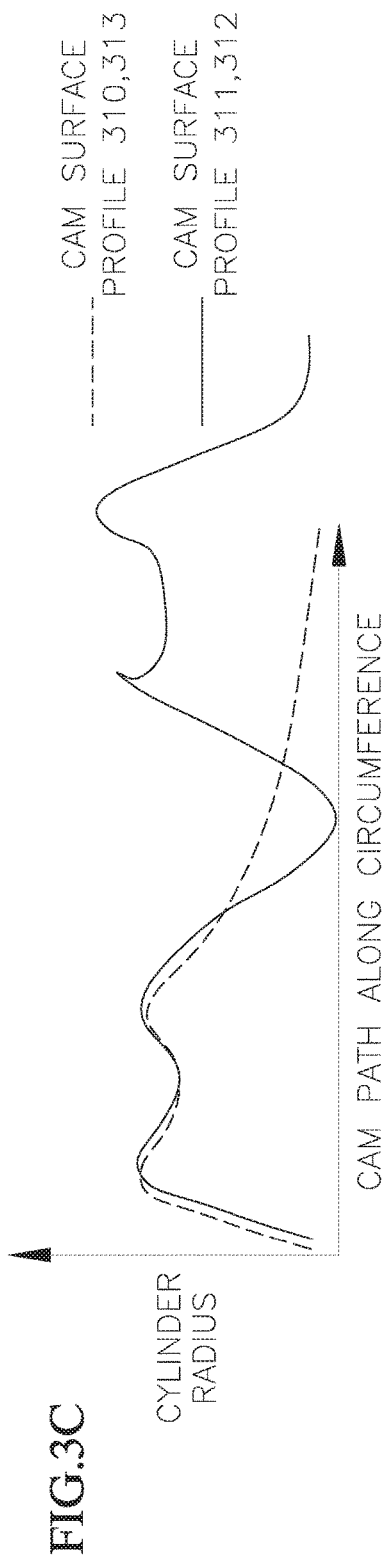
FIG. 3C is a graph depicting a cam path of a cam according to the embodiment of the adjustable negative stiffness system illustrated in FIGS. 3A-3B.

FIG. 3C is a graph depicting the cam surface profiles 310, 311, 312, 313 of the first, second, third, and fourth regions 306, 307, 308, 309 of the embodiment of the cam 303 illustrated in FIGS. 3A-3B. In the illustrated embodiment, the cam surface profiles 310, 313 of the first and fourth regions 306, 309 on the cam 303, which engage the outer ends 305 of the first and fourth negative stiffness members 302 are the same or substantially the same, and the cam surface profiles 311, 312 of the second and third regions 307, 308 on the cam 303, which engage the outer ends 305 of the second and third negative stiffness members 302 are the same or substantially the same. In one or more embodiments, each cam surface profile 310, 311, 312, 313 may be distinct (e.g., unique). In one or more embodiments, the cam 303 may include two or more of the same cam surface profiles. Additionally, in one or more embodiments, the cam 303 may include two or more of the same cam surface profile, but the cam surface profiles may be angularly offset (e.g., rotated) from each other.

As illustrated in FIG. 3C, when the cam 303 is rotated (arrow 314) into a first angular position (illustrated between the two left peaks in FIG. 3C), the cam surface profiles 310, 311, 312, 313 of the first, second, third, and fourth regions 306, 307, 308, 309 of the cam 303 engage the outer ends 305 of the first, second, third, and fourth negative stiffness members 302, respectively, and thereby compress (e.g., buckle) each of the negative stiffness members 302. When the cam 303 is rotated (arrow 314) further into a second angular position (illustrated between the two right peaks in FIG. 3C), the cam surface profiles 310, 313 of the first and fourth regions 306, 309 of the cam 303 relax (e.g., unbuckle) the first and fourth negative stiffness members 302 and the cam surface profiles 311, 312 of the second and third regions 307, 308 of the cam 303 compress (e.g., buckle) the second and third negative stiffness members 302. Accordingly, in the illustrated embodiment, when the cam 303 is in the second angular position, the first and fourth negative stiffness members 302 are in the relaxed (e.g., unbuckled) state and the second and third negative stiffness members 302 are in the compressed (e.g., buckled) state. In this manner, the rotation (arrow 314) of the cam 303 is configured to change or switch the negative stiffness system 300 between two different negative stiffness response states. In one or more embodiments, the cam surface profiles 310, 311, 312, 313 of the cam 303 may be configured to change or switch the negative stiffness system 300 between any other suitable number of negative stiffness response states, such as, for instance, three or more negative stiffness response states. Additionally, although in the illustrated embodiment the cam 303 is configured to move the first and fourth negative stiffness members 302 in unison and to move the second and third negative stiffness members 302 in unison, in one or more embodiments, the cam surface profiles 310, 311, 312, 313 of the cam 303 may be configured (e.g., arranged) to move any other suitable negative stiffness member 302 or combination of negative stiffness members 302 between the compressed (e.g., buckled) and uncompressed (e.g., unbuckled) states.

The cam 303 may be configured to be rotated (arrow 314) manually or automatically. For instance, in one or more embodiments, the negative stiffness system 300 may include a crank coupled to the cam 303 to facilitate manual rotation of the cam 303. In one or more embodiments, the negative stiffness system 300 may include a motor (e.g., an electromagnetic motor) coupled to the cam 303 to facilitate automatic rotation of the cam 303. Additionally, in one or more embodiments, the negative stiffness system 300 may include a set of gears and/or pulleys to increase the torque on the cam 303.

In one or more embodiments, the negative stiffness system 300 may include negative stiffness members 302 with two or more different configurations. For instance, in one or more embodiments, the first and fourth negative stiffness members 302 may have a different configuration (e.g., different thickness and/or different width) than the second and third negative stiffness members 302.

Figure 3D:
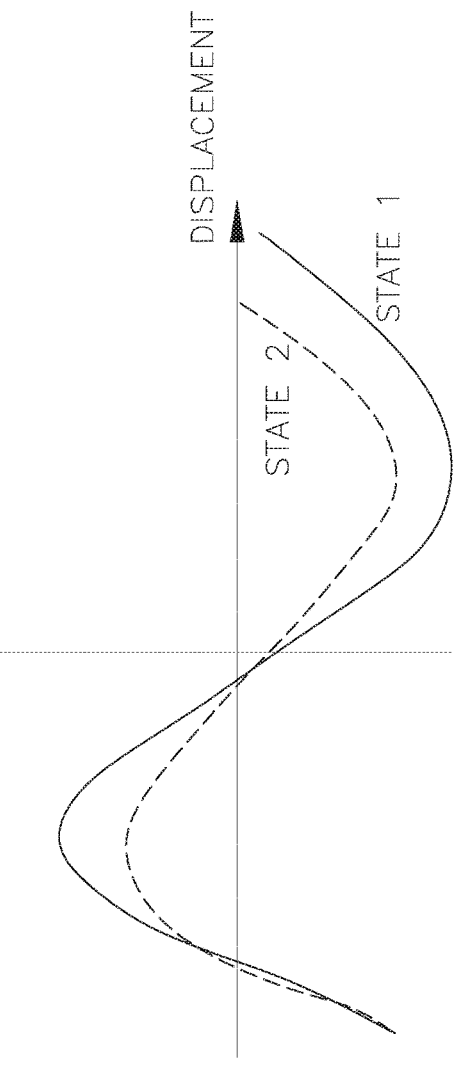
FIG. 3D is a graph of the stiffness behavior of the embodiment of the adjustable negative stiffness system illustrated in FIGS. 3A-3B.

FIG. 3D is a graph of the stiffness behavior of the embodiment of the adjustable negative stiffness system 300 illustrated in FIGS. 3A-3B when the cam 303 is in the first angular position ("state 1") (illustrated between the two left peaks in FIG. 3C) and when the cam 303 is in the second angular position ("state 2") (illustrated between the two right peaks in FIG. 3C).

Figures 4A, 4B, 4C:
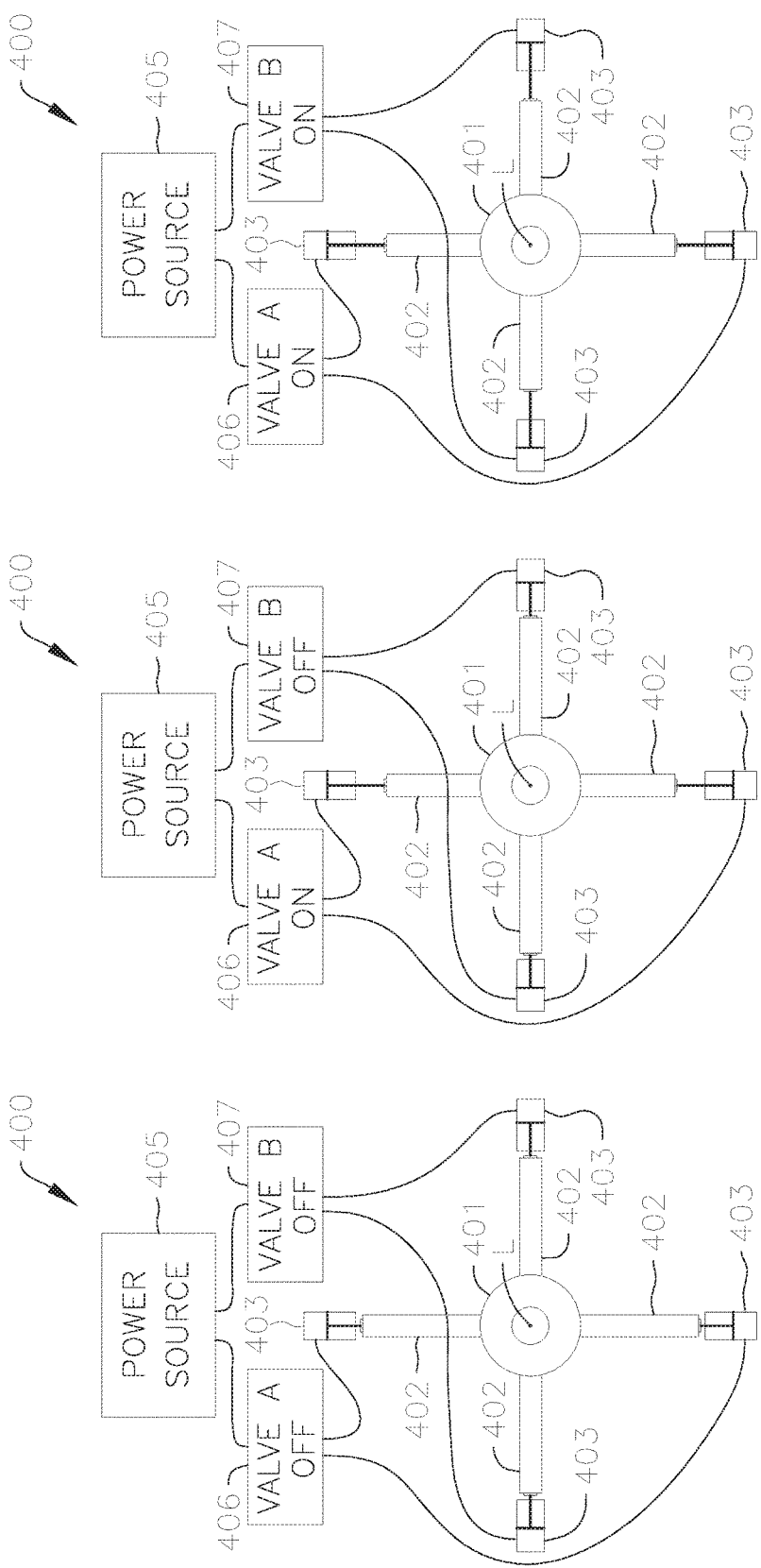
FIGS. 4A-4C are top views of an adjustable negative stiffness system according to another embodiment of the present disclosure in a first state, a second state, and a third state, respectively.

With reference now to FIGS. 4A-4C, an adjustable negative stiffness system 400 according to another embodiment of the present disclosure includes a central shaft 401 defining a longitudinal axis L, a series of negative stiffness members 402 extending radially outward from the central shaft 401, a series of actuators 403 configured to engage outer ends 404 of the negative stiffness members 402, and a power source 405 configured to be selectively coupled to the actuators 403. The actuators 403 are configured to move select negative stiffness members 402 between a relaxed (e.g., unbuckled) state and a compressed (e.g., buckled) state to adjust the negative stiffness response of the adjustable negative stiffness system 400.

The negative stiffness members 402 may have the same or similar configuration as the negative stiffness members 103 in the embodiment of the adjustable negative stiffness system 100 illustrated in FIGS. 1A-1C (e.g., each of the negative stiffness members 402 may include one or more snap-through beams). Additionally, although in the illustrated embodiment, the negative stiffness system 400 includes four negative stiffness members 402 circumferentially and equidistantly spaced around the central shaft 401 (e.g., two pairs of opposing negative stiffness members 402), in one or more embodiments, the negative stiffness system 400 may include any other suitable number of negative stiffness members 402, such as, for instance, from two to ten negative stiffness members 402, and the negative stiffness members 402 may be arranged in any other suitable manner. Although the adjustable negative stiffness system 400 is described hereinafter as including a "vertically oriented" pair of negative stiffness members 402 and a "horizontally oriented" negative stiffness members 402, these terms are used for ease of reference only and do not limit the potential orientations of the negative stiffness members 402.

The actuators 403 may be any suitable type or kind of actuators, such as, for instance, pneumatic actuators, hydraulic actuators, motors (e.g., brushless DC electric motors), electrostatic actuators, electromagnetic actuators, thermal actuators (e.g., shape memory alloys), piezoelectric actuators, mechanical actuators, or combinations thereof. In the illustrated embodiment, the actuators may be hydraulic pistons. In one or more embodiments, the actuators 403 may each include an active material (e.g., a shape memory alloy). The active material may be tuned to respond to external fields. For instance, in one or more embodiments, the active material (e.g., a shape memory alloy) may be tuned to automatically respond to changes in ambient temperature and thereby change the overall negative stiffness response of the adjustable negative stiffness system 400 according to changes in the ambient temperature of the environment in which the adjustable negative stiffness system 400 is operating. In one or more embodiments, the actuators 403 may be individual cams engageable with the outer ends of the negative stiffness members 402.

Additionally, the power source 405 may be any type or kind of power source suitable for the type or kind of actuators 403. In the illustrated embodiment, the power source 405 is a hydraulic actuation system (e.g., a pump and/or an accumulator) configured to selectively actuate the hydraulic actuators 403. In one or more embodiments, the power source 405 may include a battery and/or pneumatic pump.

Additionally, in the illustrated embodiment, the adjustable negative stiffness system 400 includes two valves 406, 407. The first valve 406 is connected between the power source 405 and the hydraulic actuators 403 (coupled to the vertically oriented negative stiffness members 402) and the second valve 407 is connected between the power source 405 and the hydraulic actuators 403 (coupled to the horizontally oriented negative stiffness members 402). In one or more embodiments, the adjustable negative stiffness system 400 may include any other suitable number of valves 406, 407, depending, for instance, on the number of pairs of opposing negative stiffness members 402 and/or the number of actuators 403.

In an initial state illustrated in FIG. 4A, both the first and second valves 406, 407 are closed (or off) and both the horizontally oriented negative stiffness members 402 and the vertically oriented negative stiffness members 402 are in the relaxed (e.g., uncompressed) state (e.g., all of the negative stiffness members 402 are in the relaxed state when the first and second valves 406, 407 are closed or off).

As illustrated in FIG. 4B, the horizontally oriented negative stiffness members 402 may be selectively compressed (e.g., buckled) by opening the second valve 407. Opening the second valve 407 actuates the hydraulic actuators 403 coupled to the outer ends 404 of the horizontally oriented negative stiffness members 402, and the actuation of these hydraulic actuators 403 compresses (e.g., buckles) the horizontally oriented negative stiffness members 402.

As illustrated in FIG. 4C, the vertically oriented negative stiffness members 402 may be selectively compressed (e.g., buckled) by opening the first valve 406. Opening the first valve 406 actuates the hydraulic actuators 403 coupled to the outer ends 404 of the vertically oriented negative stiffness members 402, and the actuation of these hydraulic actuators 403 compresses (e.g., buckles out of the plane of the page of FIGS. 4A-4C) the vertically oriented negative stiffness members 402. Although in FIG. 4C the horizontally oriented negative stiffness members 402 remain in the compressed (e.g., buckled) state, the horizontally oriented negative stiffness members 402 may be returned to the relaxed (e.g., unbuckled) state by closing the second valve 407.

Accordingly, the embodiment of the adjustable negative stiffness system 400 illustrated in FIGS. 4A-4C is configured to achieve four different negative stiffness response states by selectively opening and closing (or turning on and off) the valves 406, 407 to selectively actuate the actuators 403 and thereby selectively compress (e.g., buckle) and/or relax (e.g., unbuckle) the negative stiffness members 402. In the illustrated embodiment, the negative stiffness system 400 is configured to exhibit a first negative stiffness response by closing (or turning off) both of the valves 406, 407 to move both the vertically and horizontally oriented negative stiffness members 402 into a relaxed (e.g., uncompressed) state, a second negative stiffness response by opening only the first valve 406 to move only the vertically oriented negative stiffness members 402 into the compressed (e.g., buckled state), a third negative stiffness response by opening (or turning on) only the second valve 407 to move only the horizontally oriented negative stiffness members 402 into the compressed (e.g., buckled state), and a fourth negative stiffness response by opening (or turning on) both the first and second valves 406, 407 to move both the vertically and horizontally oriented negative stiffness members 402 into the compressed (e.g., buckled state). In one or more embodiments, the adjustable negative stiffness system 400 may be configured to achieve any other suitable number of negative stiffness response states, depending, for instance, on the number of pairs of opposing negative stiffness members 402, the number of actuators 403, and/or the number of valves 406, 407.

With reference now to FIGS. 5A-5C, a variable stiffness structure 500 according to one embodiment of the present disclosure includes at least one pair of opposing buckling-type snap through beams 501, 502 (e.g., at least one pair of opposing negative stiffness buckling beams). The buckling-type snap through beams 501, 502 are buckled in opposite directions (e.g., the upper buckling-type snap through beam 501 is buckled upward and the lower buckling-type snap through beam 502 is buckled downward). For instance, in the illustrated embodiment, the variable stiffness structure 500 includes a stack of three upper buckling-type snap through beams 501 (e.g., three upper negative stiffness buckling beams) and a stack of three lower buckling-type snap through beams 502 (e.g., three lower negative stiffness buckling beams). Although in the illustrated embodiment the variable stiffness structure 500 includes three pairs of upper and lower buckling-type snap through beams 501, 502, in one or more embodiments, the variable stiffness structure 500 may include any other suitable number of pairs of buckling-type snap through beams 501, 502, such as, for instance, one pair to six pairs of opposing buckling-type snap through beams 501, 502 depending on the desired negative stiffness exhibited by the variable stiffness structure 500. In one or more embodiments, the variable stiffness structure 500 includes a stack of two upper buckling-type snap through beams 501 (e.g., two upper negative stiffness buckling beams) and a stack of two lower buckling-type snap through beams 502 (e.g., two lower negative stiffness buckling beams). In general, increasing the number of buckling-type snap through beams 501, 502 increases the negative stiffness of the variable stiffness structure 500. Additionally, in the illustrated embodiment, the upper and lower buckling-type snap through beams 501, 502 are symmetric about a centerline L.

In the illustrated embodiment, the snap-through beams 501, 502 are monolithic (i.e., the thicknesses of the beams 501, 502 are constant or substantially constant along the length of the beams 501, 502). In one or more embodiments, the beams 501, 502 may be "composite" beams wherein the thickness of one or more of the beams varies along the length of the beam (i.e., one or more of the beams may have a non-uniform thickness) to induce buckling mode shapes that are not "pure" cosine curves. For instance, ends 503, 504 and center portions 505 of the snap-through beams 501, 502 may have a lower thickness and stiffness than remaining portions of the snap-through beams 501, 502. Additionally, in one or more alternate embodiments, one or both of the ends 503, 504 may be coupled to a low stiffness coupler, such as, for instance, a flexure, a pivot, a bearing, a roller bearing pin, or a wobble-pin.

In the embodiment illustrated in FIGS. 5A-5C, the opposite ends 503, 504 of the snap-through beams 501, 502 are clamped together and coupled to structures or supports 506, 507, respectively. In the illustrated embodiment, the variable stiffness structure 500 also includes an actuator 508 operatively coupled to one end 503 of the snap-through beams 501, 502. The actuator 508 may be any suitable type (or kind) of actuator, such as, for instance, a pneumatic actuator, a hydraulic actuator, a motor (e.g., a brushless DC electric motor), an electrostatic actuator, an electromagnetic actuator, a thermal actuator (e.g., shape memory alloys), a piezoelectric actuator, a mechanical actuator, or combinations thereof. In one or more alternate embodiments, the variable stiffness structure 500 may include any other suitable number of actuators located at any other suitable positions relative to the negative stiffness beam 501, 502, such as, for instance, a single actuator located at the other end 504 of the snap-through beam 501, 502 or a pair of actuators located at both ends 503, 504 of the snap-through beams 501, 502. The actuator 508 may be actuated (arrow 509) to compress or elongate the snap-through beams 501, 502 and thereby increase or decrease, respectively, the amount of negative stiffness of the variable stiffness structure 500 (i.e., the actuator 508 is configured to expand and compress (arrow 509) along the x-direction to decrease and increase, respectively, the distance between the opposite ends 503, 504 of the negative stiffness beams 501, 502 and thereby control the degree of negative stiffness of the variable stiffness structure 500).

With continued reference to the embodiment illustrated in FIGS. 5A-5C, the negative stiffness beams 501, 502 are "mode 3" buckling beams (e.g., mode-3 type (or kind) buckling-type snap through beams). The mode number refers to the number of times the negative stiffness beams 501, 502 cross their centerline during buckling (i.e., the number of "humps" or sine waves that are present during buckling). In the illustrated embodiment, the negative stiffness beams 501, 502 each have three "humps" $H_1$, $H_2$, $H_3$ during buckling.

FIGS. 5A-5C also illustrate an object or structure 510 that the variable stiffness structure 500 is configured to isolate from unwanted vibrations. In the illustrated embodiment, the object 507 is coupled (e.g., clamped) to the center portions 506 of the beams 501, 502 (e.g., the object 507 may be clamped around at least portions of the center portions 506 of the beams 501, 502 such that the beams 501, 502 pass through the object 507).

As illustrated in FIGS. 5B-5C, the pairs of opposing snap-through beams 501, 502 are configured to "snap" between a first stable position (the upper set of dashed lines in FIG. 5B) and a second stable position (the lower set of dashed lines in FIG. 5C). Within an envelope defined or bounded by these two stable positions, the variable stiffness structure 500 exhibits negative stiffness (i.e., negative stiffness is generated during snap through between the two stable positions illustrated in FIGS. 5B-5C). Outside of this envelope bounded by the two stable positions of the snap-through beams 501, 502, the variable stiffness structure 500 exhibits positive stiffness. Accordingly, the variable stiffness structure 500 exhibits non-linear stiffness. In one or more embodiments, the stiffness of the beams 501, 502 may be relatively high and the variable stiffness structure 500 may include a spring or a managed-stiffness housing coupled to one end 503 or 504 of the beams 501, 502 to facilitate snap-through of the beams 501, 502. Additionally, in one embodiment, the snap-through beams 501, 502 may have an aspect ratio of length to thickness between approximately or about 5:1 and approximately or about 20:1 and an aspect ratio of width to thickness between approximately or about 1:2 and approximately or about 1:10, which can allow for suitable buckling resistance.

Arranging the buckling-type snap through beams 501, 502 symmetrically about the centerline L (see FIG. 5A) is configured to minimize or at least mitigate the generation of a reaction moment (i.e., torque) at the clamped ends 503, 504 of the buckling-type snap through beams 501, 502. That is, the symmetric deformation of the upper and lower beams 501, 502 (i.e., the buckling of the beams 501, 502 in opposite directions about the centerline L) is configured to cancel out the reaction moment created at the clamped ends 503, 504 of the buckling-type snap through beams 501, 502 and minimize or at least reduce the reaction moments at the clamped ends 503, 504 of the buckling-type snap through beams 501, 502 when the object or structure 510 is deflected up or down (arrow 511).

In the embodiment illustrated in FIGS. 5A-5C, the upper snap-through beams 501 are spaced apart from each other by a gap 512 and the lower snap-through beams 501 are spaced apart from each other by a gap 513. Additionally, in the illustrated embodiment, the variable stiffness structure 500 includes spacers 514, 515 arranged between adjacent upper snap-through beams 501 (e.g., between adjacent upper negative stiffness buckling beams) and between adjacent lower snap-through beams 502 (e.g., between adjacent lower negative stiffness buckling beams), respectfully, to control the gaps 512 (i.e., the spacing) between the upper snap-through beams 501 and the gaps 513 (i.e., the spacing) between the lower snap-through beams 502. The spacers 514, 515 may have any suitable thickness depending on the desired damping of the variable stiffness structure 500. In general, relatively thicker spacers 514, 515 (e.g., spacers having a thickness from approximately 0.5-2 times the thickness of the beams 501, 502) result in relatively small damping, relatively thinner spacers (e.g., spacers having a thickness from approximately 0.05-0.25 times the thickness of the beams 501, 502) result in moderate damping. Accordingly, in general, decreasing the thickness of the spacers 514, 515 increases the amount of damping exhibited by the variable stiffness structure 500. Additionally, in one or more embodiments, the variable stiffness structure 500 may be provided without the spacers 514, 515, which will result in relatively large damping at all amplitudes. For instance, when the beams 501, 502 are displaced by a relatively small amount relative to the central or neutral position (shown in solid lines in FIGS. 5B-5C), the beams 501, 502 remain spaced apart from each other by the gaps 512, 513, respectively (i.e., the stack of upper beams 501 do not touch each other and the stack of lower beams 502 do not touch each other). At relatively higher deflections (as shown in dashed lines in FIGS. 5B-5C), the beams 501, 502 may not bend in exactly the same way or manner and may touch each other due to initial manufacturing defects or imperfections in the beams 501, 502. Contact between the beams 501, 502 introduces damping and energy dissipation at higher deflections of the beams 501, 502 and also during high off-axis loading that may twist the object or structure 510 relative to the supports 506, 507, which may be a desirable effect for isolation systems.

Additionally, in the embodiment illustrated in FIG. 5A, the variable stiffness structure 500 includes one or more resilient elements 514 between the innermost or centralmost beams 501, 502 to ensure that the beams 501, 502 buckle into symmetrically opposed shapes (i.e., the variable stiffness structure 500 includes one or more resilient elements 516 between the innermost upper beam 501 and the innermost lower beam 502 that faces the innermost upper beam 501). Although in the illustrated embodiment the variable stiffness structure 500 includes four resilient elements 516, in one or more embodiments the variable stiffness structure 500 may include any other suitable number of resilient elements 516, such as, for instance, from one to eight resilient elements 516. Additionally, the one or more resilient elements 516 may be made from any suitable resilient material, such as, for instance, a rubber bushing and/or a small metal spring. The one or more resilient elements 516 may be coupled (e.g., bonded) to one of the innermost beams 501, 502 (i.e., coupled to the innermost upper beam 501 or coupled to the innermost lower beam 502) or held in place by a separate constraint. Additionally, in one or more embodiments, one or both of the innermost beams 501, 502 may include a relatively small protuberance (e.g., a small curvature, such as, for instance, from approximately 0.1 to approximately 0.15 the length of the beams 501, 502) that is configured to bias the beams 501, 502 to consistently buckle into symmetrically opposed shapes.

The at least one pair of opposing snap-through beams 501, 502 (e.g., the opposing pair or pairs of negative stiffness buckling beams) and, optionally, the spacers 514, 515 and/or the resilient elements 516 illustrated in FIGS. 5A-5C may be incorporated into any of the embodiments of the adjustable negative stiffness system 100, 200, 300, 400 described above and depicted in FIGS. 1A-1C, 2A-2E, 3A-3B, and 4A-4C. For instance, the negative stiffness members 103 of the adjustable negative stiffness system 100 illustrated in FIGS. 1A-1C, the negative stiffness members 203 of the adjustable negative stiffness system 200 illustrated in FIGS. 2A-2E, the negative stiffness members 302 of the adjustable negative stiffness system 300 illustrated in FIGS. 3A-3B, and/or the negative stiffness members 402 of the adjustable negative stiffness system 400 illustrated in FIGS. 4A-4C may each be replaced by at least one pair of opposing snap-through beams 501, 502 and, optionally, one or more spacers 514, 515 and/or one or more resilient elements 516, as illustrated in FIGS. 5A-5C.

In one or more embodiments, the negative stiffness members or negative stiffness elements of the present disclosure may be "mode 1" or single-mode buckling beams (e.g., mode-1 buckling-type snap through beams). In one or more embodiments, the negative stiffness members or the negative stiffness elements of the present disclosure may be higher mode or higher order buckling beams (e.g., higher order or higher mode buckling-type snap through beams), such as, for instance, mode-2 buckling beams (e.g., mode-2 buckling-type snap through beams) or higher, such as, for example, mode-3 buckling beams (e.g., mode-3 buckling-type snap through beams). As described above, the mode number refers to the number of times the buckling beam or the buckling-type snap through beam (i.e., the negative stiffness member or negative stiffness element) crosses its centerline during buckling (i.e., the number of "humps" or sine waves that are present during buckling). Additionally, in one or more embodiments, the adjustable negative stiffness systems of the present disclosure may include a combination of negative stiffness members having two or more different mode numbers.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "horizontal," "vertical," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. A variable stiffness structure, comprising:
a first negative stiffness element configured to buckle in a first direction;
a second negative stiffness element configured to buckle in a second direction opposite to the first direction;
an actuator operatively coupled to ends of the first and second negative stiffness elements to control a stiffness of the variable stiffness structure; and
at least one resilient element between the first and second negative stiffness elements and configured to bias the first and second negative stiffness elements to buckle into symmetrically opposed shapes,
wherein the first negative stiffness element and the second negative stiffness element are mode-3 buckling beams.

2. The variable stiffness structure of claim 1, wherein the first negative stiffness element comprises a first stack of at least two negative stiffness bucking beams, and wherein the second negative stiffness element comprises a second stack of at least two negative stiffness buckling beams.

3. The variable stiffness structure of claim 2, further comprising:
at least one first spacer between adjacent negative stiffness buckling beams of the first stack; and
at least one second spacer between adjacent negative stiffness buckling beams of the second stack.

4. An adjustable negative stiffness system, comprising:
a central shaft;
a plurality of negative stiffness members radially arranged around the central shaft, each negative stiffness member of the plurality of negative stiffness members being configured to move between an unbuckled state and a buckled state; and
an actuator configured to engage outer ends of the plurality of negative stiffness members to selectively move opposing pairs of the negative stiffness members between the unbuckled and buckled states,
wherein the actuator comprises a cam having an inwardly-facing cam surface rotatable about the central shaft and surrounding the outer ends of the plurality of negative stiffness members, the inwardly-facing cam surface comprising a plurality of compression segments configured to buckle the negative stiffness members and a plurality of relaxation segments configured to unbuckle the negative stiffness members,
wherein rotation of the cam in a first direction causes one negative stiffness member of the plurality of negative stiffness members to slide along one compression segment of the plurality of compression segments, and
wherein continued rotation of the cam in the first direction causes the one negative stiffness member to slide from the one compression segment to one relaxation segment of the plurality of relaxation segments.

5. The adjustable negative stiffness system of claim 4, wherein rotation of the cam is configured to sequentially move the opposing pairs of the negative stiffness members between the unbuckled and buckled states.

6. The adjustable negative stiffness system of claim 5, wherein the inwardly-facing cam surface of the cam comprises a non-sinusoidal shape in a circumferential direction.

7. The adjustable negative stiffness system of claim 5, wherein the inwardly-facing cam surface of the cam comprises an irregular shape in a circumferential direction.

8. The adjustable negative stiffness system of claim 4, wherein each compression segment of the plurality of compression segments is configured to transition non-linearly between a first end spaced apart from a longitudinal axis of the central shaft by a first radial distance and a second end spaced apart from the longitudinal axis by a second radial distance less than the first radial distance.

9. The adjustable negative stiffness system of claim 4, wherein each compression segment of the plurality of compression segments is spaced apart from a longitudinal axis of the central shaft by a substantially constant first radial distance and each relaxation segment of the plurality of relaxation segment is spaced apart from the longitudinal axis of the central shaft by a substantially constant second radial distance greater than the first radial distance.

10. The adjustable negative stiffness system of claim 4, wherein a first pair of opposing negative stiffness members has a different configuration than a second pair of opposing negative stiffness members.

11. An adjustable negative stiffness system, comprising:
a central shaft;
a plurality of negative stiffness members radially arranged around the central shaft, each negative stiffness member of the plurality of negative stiffness members being configured to move between an unbuckled state and a buckled state; and
an actuator configured to engage outer ends of the plurality of negative stiffness members to selectively move opposing pairs of the negative stiffness members between the unbuckled and buckled states, wherein the actuator comprises:
a first pair of actuators coupled to a first pair of opposing negative stiffness members;
a second pair of actuators coupled to a second pair of opposing negative stiffness members;
a first valve coupled to the first pair of actuators configured to move between an open position and a closed position, wherein the first pair of actuators is configured to move the first pair of opposing negative stiffness members into the buckled state when the first valve is in the open position; and a second valve coupled to the second pair of actuators configured to move between an open position and a closed position, wherein the second pair of actuators is configured to move the second pair of opposing negative stiffness members into the buckled state when the second valve is in the open position.

12. The adjustable negative stiffness system of claim 11, wherein the first and second pairs of actuators are selected from the group of actuators consisting of hydraulic actuators, pneumatic actuators, electromagnetic actuators, thermal actuators, piezoelectric actuators, and mechanical actuators.

13. The adjustable negative stiffness system of claim 11, further comprising a power source coupled to the first and second pairs of actuators.

14. An adjustable negative stiffness system, comprising:
a base;
a plurality of negative stiffness members coupled to the base and arranged along a direction, each negative stiffness member of the plurality of negative stiffness members being configured to move between an unbuckled state and a buckled state; and
a rotatable cam comprising a plurality of regions, each region having a cam surface configured to engage an end of one of the negative stiffness members opposite the base to move the one of the negative stiffness members between the unbuckled and buckled states.

15. The adjustable negative stiffness system of claim 14, further comprising a crank configured to facilitate manual rotation of the rotatable cam or a motor configured to rotate the rotatable cam.

16. The adjustable negative stiffness system of claim 14, wherein a first cam surface of a first region of the cam is different than a second cam surface of a second region of the cam.

17. The adjustable negative stiffness system of claim 14, wherein a first cam surface of a first region of the cam is substantially the same as a second cam surface of a second region of the cam.

18. The adjustable negative stiffness system of claim 14, further comprising a plurality of tensile members coupled to the plurality of negative stiffness members.

* * * * *